US006549873B1

(12) United States Patent
Nagai

(10) Patent No.: US 6,549,873 B1
(45) Date of Patent: Apr. 15, 2003

(54) POSITION DETECTING DEVICE FOR HYDRAULIC CYLINDER, AND DETECTING METHOD THEREOF

(75) Inventor: Katsumi Nagai, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 135 days.

(21) Appl. No.: 09/634,565

(22) Filed: Aug. 9, 2000

(30) Foreign Application Priority Data

Aug. 27, 1999 (JP) .......................................... 11-241854

(51) Int. Cl.[7] ............................. B66F 9/24; G06F 15/00

(52) U.S. Cl. ........................... 702/159; 702/47; 702/50; 367/97; 92/5 R

(58) Field of Search ........................... 73/744; 172/239; 700/69; 92/5 R; 702/159, 50, 55, 45, 47; 367/197

(56) References Cited

U.S. PATENT DOCUMENTS 5,150,049 A * 9/1992 Schuetz ................. 324/207.12
6,267,042 B1 * 7/2001 Nagai .......................... 92/5 R

FOREIGN PATENT DOCUMENTS

JP 10224946 * 8/1998
JP 10241707 * 8/1998
JP 10-241707 * 8/1998
JP 10-238513 9/1998
JP 11240365 * 8/1999
JP 11-240367 * 8/1999

* cited by examiner

*Primary Examiner*—Kamini Shah
(74) *Attorney, Agent, or Firm*—Morgan & Finnegan, LLP

(57) ABSTRACT

A pressure sensor is set in a conduit connected to a cylinder tube, and a temperature sensor is disposed within a chamber. Detection signals of the pressure sensor and the temperature sensor are sent to a control circuit. A sonic speed of the ultrasonic wave is corrected by using a relational formula or a map that is indicative of the relationship of the temperature and pressure of hydraulic oil to the sonic speed and that is stored in the storage device. A distance from an ultrasonic wave sensor to a bottom surface of the piston is calculated based on the sonic speed and a measurement time length detected by the ultrasonic wave sensor.

4 Claims, 2 Drawing Sheets

POSITION DETECTING DEVICE FOR HYDRAULIC CYLINDER, AND DETECTING METHOD THEREOF

BACKGROUND OF THE INVENTION

1. Field of the Invention

The present invention relates to a lift cylinder (a hydraulic cylinder) in a fork lift, and in particular to a technology for detecting a position of a piston in the lift cylinder.

2. Description of the Related Art

In general, a lift cylinder (a hydraulic cylinder) is installed in a fork lift to move a fork upwardly and downwardly. By reciprocating a piston rod in the lift cylinder, the fork is moved upwardly and downwardly. Hence, in a case where various controls are applied to the fork in the fork lift having the lift cylinder, the upwardly and downwardly moved positions and upwardly and downwardly moving speeds of the fork are detected by measuring a position and a moving speed of the piston rod (the piston) of the lift cylinder.

As means for detecting the position or the moving speed of the piston of the lift cylinder, an ultrasonic wave sensor is typically used. An example of the lift cylinder using such ultrasonic wave sensor is described in Japanese Patent Laid-Open No. 10-238513.

In the lift cylinder described in this publication, an ultrasonic wave sensor for transmitting and receiving an ultrasonic wave is installed at a position where it is confronted with a bottom surface of a piston reciprocating within the lift cylinder (using hydraulic oil as a power medium). The ultrasonic wave transmitted from the ultrasonic wave sensor toward the piston (i.e., a transmitted wave) is transmitted through the hydraulic oil and reflected by the bottom surface of the piston, so that the reflected ultrasonic wave (i.e., a received wave) is received by the ultrasonic wave sensor. Since the speed (i.e., the sonic speed) of the ultrasonic wave transmitted through the hydraulic oil is affected by the temperature, a temperature sensor is set within the lift cylinder so as to detect the temperature to correct the sonic speed. The data of the sonic speed thus corrected depending on the temperature within the lift cylinder and the data on a time lag (a measurement time length) of the received wave relative to the transmitted wave are subjected to an arithmetic processing in a control device, thereby calculating a distance (a measurement length of distance) between the ultrasonic sensor and the bottom surface of the piston. With this measurement length of distance, the position and the moving speed of the piston within the lift cylinder is structured to be detected.

However, it is generally known that the speed of the ultrasonic wave transmitted through the medium (for example, the hydraulic oil) is affected by not only the temperature but also the pressure. For example, under a condition in which the temperature is constant, if the pressure within the cylinder is increased, the sonic speed transmitted through the hydraulic oil is increased, and therefore the estimated measurement length distance thus calculated and detected becomes shorter than the accurate measurement length distance between the ultrasonic wave sensor and the bottom surface of the piston.

Consequently, in the above-mentioned conventional position detecting device using the ultrasonic wave sensor as a detecting means, it is impossible to obtain the measurement length distance (the position of the piston with respect to the ultrasonic sensor) with high accuracy if the pressure within the cylinder is varied, and thus it was difficult to detect the position of the piston within the cylinder accurately.

SUMMARY OF THE INVENTION

Accordingly, an object of the present invention is to provide a position detecting device for a hydraulic cylinder and a position detecting method thereof, which can accurately detect a position of a piston within the cylinder using an ultrasonic wave sensor even if the pressure within the hydraulic cylinder is varied.

A position detecting device for a hydraulic cylinder according to the present invention is a hydraulic cylinder position detecting device for detecting a position of a piston with a ultrasonic wave, the piston being movable within a cylinder, the detecting device including an ultrasonic wave sensor provided within the cylinder for transmitting the ultrasonic wave toward the piston and receiving the ultrasonic wave reflected by the piston, a pressure sensor for detecting a pressure of fluid through which the ultrasonic wave is transmitted within the cylinder, and arithmetic calculation means for calculating a sonic speed of the ultrasonic wave based on the pressure of fluid detected by this pressure sensor to calculate the position of the piston based on this sonic speed.

A position detecting method for a hydraulic cylinder according to the present invention is a hydraulic cylinder position detecting method for detecting a position of a piston with an ultrasonic wave, the piston being movable within the cylinder, the detecting method including the steps of transmitting the ultrasonic wave toward the piston and receiving the ultrasonic wave reflected by the piston, detecting a pressure of fluid through which the ultrasonic wave is transmitted within the cylinder, calculating a sonic speed of the ultrasonic wave based on the detected pressure of fluid to calculate the position of the piston based on this sonic speed.

DESCRIPTION OF THE PREFERRED EMBODIMENT

Hereafter, an arrangement of a hydraulic cylinder position detecting device of the present invention will be described with reference to the accompanying drawings. A case in which the present invention is applied to a lift cylinder of a forklift will be explained.

Figure 1:
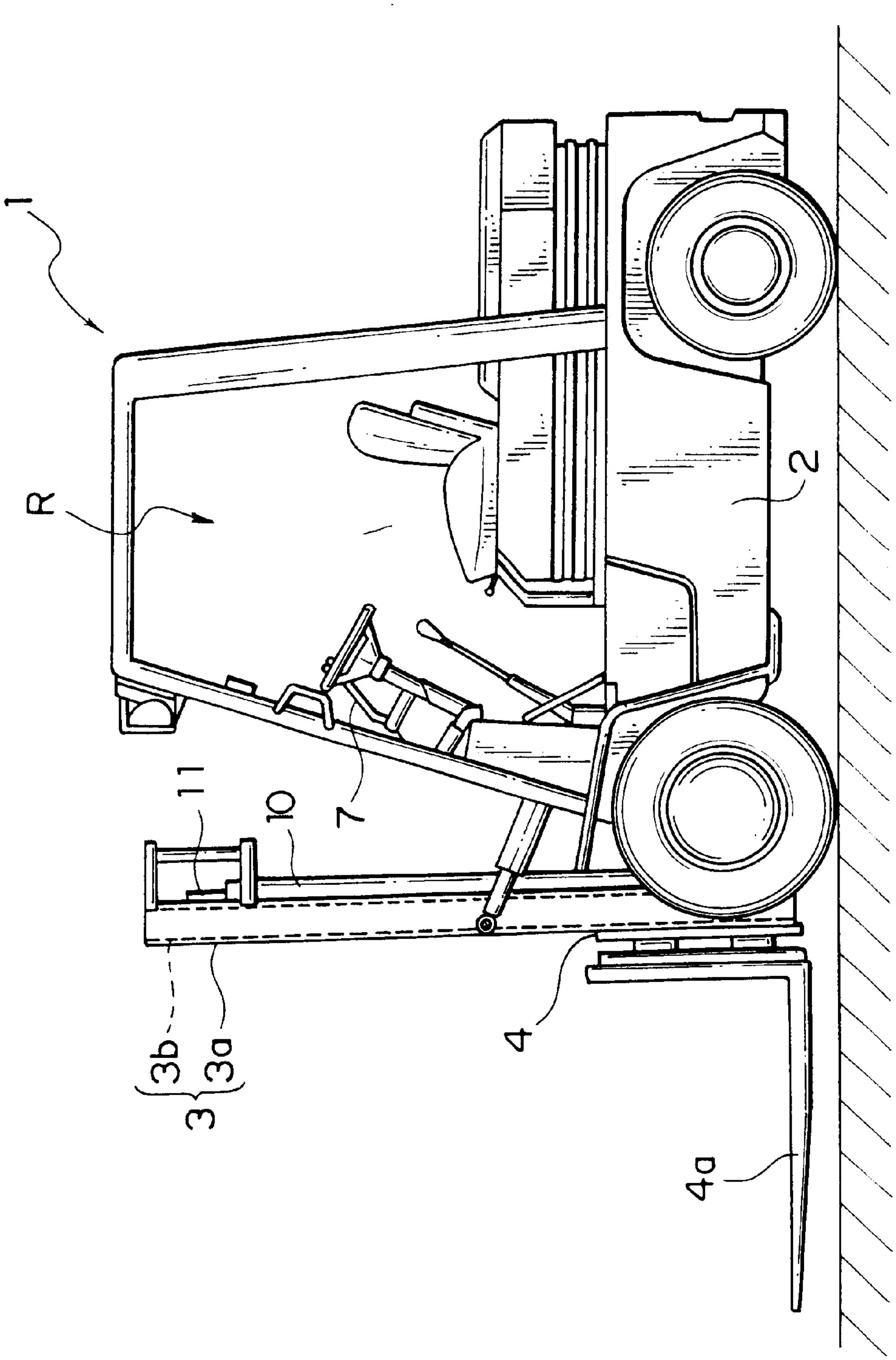
FIG. 1 is a side view showing a forklift using a position detecting device for a hydraulic cylinder according to an embodiment of the present invention.

As shown in FIG. 1, a mast 3 is provided on a front portion of a vehicle body 2 of a fork lift 1 that is an industrial vehicle. The mast 3 is made up of an outer mast 3*a* and an inner mast 3*b* installed in an inner side of the outer mast 3*a* to be movable upwardly and downwardly. A lift bracket 4 having a fork 4*a* is supported onto an inner side of the inner mast 3*b* to be movable upwardly and downwardly.

A lift cylinder 10 serving as a hydraulic cylinder is disposed behind the mast 3. The leading end of a piston rod 11 is connected to an upper portion of the inner mast 3*b*. A chain wheel (not shown) is rotatably supported on the upper portion of the inner mast 3*b*. A chain (not shown) with one end connected to a lift bracket 4 and the other end connected to the upper portion of the lift cylinder is hung on the chain wheel. By operating a loading lever 7 provided in a driving room R, the lift cylinder 10 is protrudingly and retractingly driven so that the fork 4*a* together with the lift bracket 4 is moved upwardly and downwardly along the mast 3. A hydraulic cylinder using a hydraulic oil as a power medium is employed as the lift cylinder 10.

Next, the arrangement of the lift cylinder 10 will be described with reference to FIG. 2.

Figure 2:
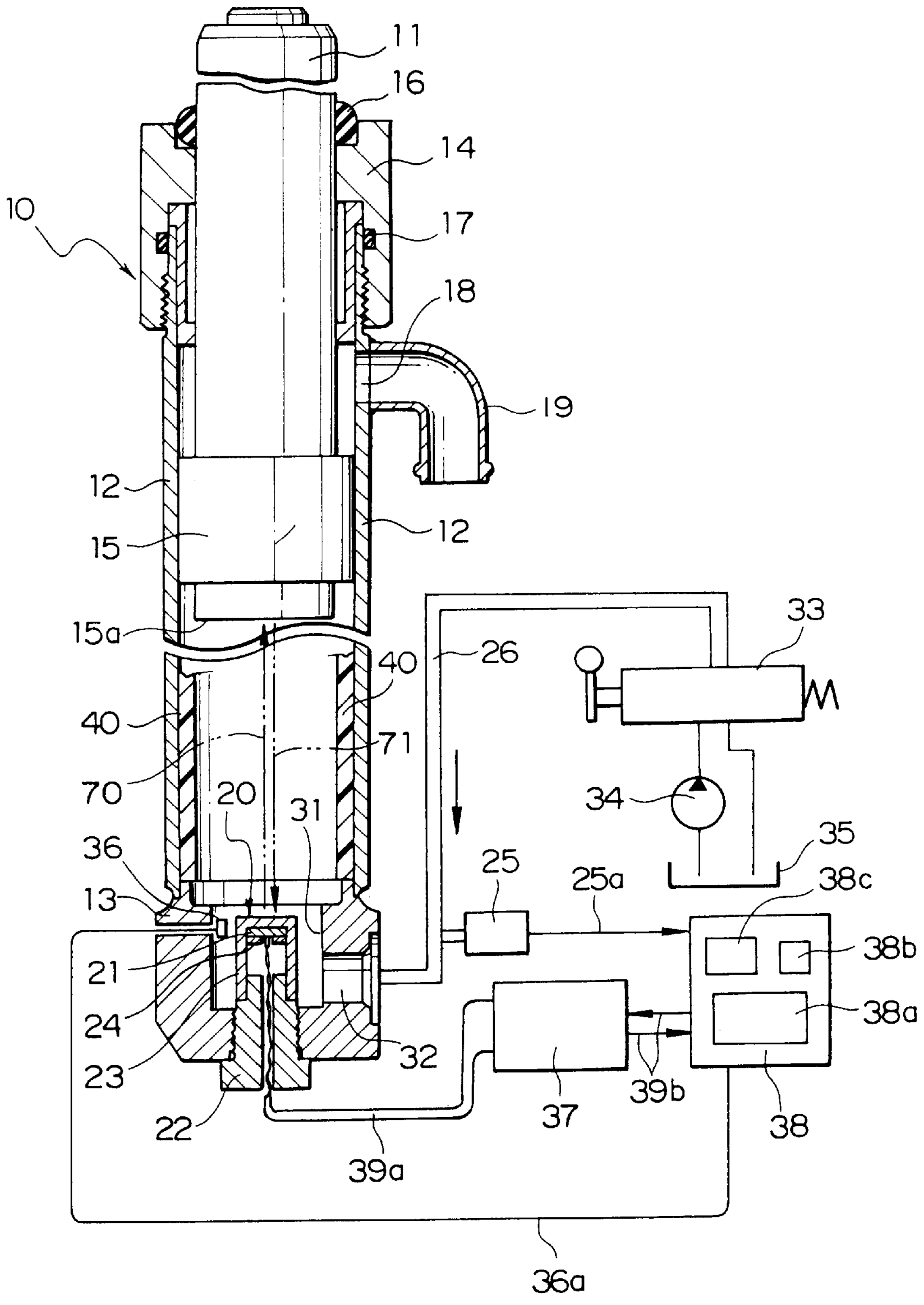
FIG. 2 is a view showing the hydraulic cylinder position detecting device.

As shown in FIG. 2, a single action type piston cylinder is employed as the lift cylinder 10. The lift cylinder 10 includes a cylindrical cylinder tube 12, a cylinder block 13, a rod cover 14, a piston rod 11, a piston 15 movable integrally with the piston rod 11, and so on. The lift cylinder 10 is installed on the fork lift 1 so that the cylinder block 13 is located at the lower side (in FIG. 2). The piston rod 11 is inserted into the cylinder tube 12, and a sealing member 16 is set on the insertion opening thereof. An O-ring is set between the outer circumferential surface of the cylinder tube 12 and the inner surface of the rod cover 14.

The cylinder tube 12 is formed with an exhaust port 18. An overflow pipe 19 is fixed to the exhaust port 18 so that the air compressed by the piston 15 is discharged through the overflow pipe 19 when the piston rod 11 is moved upwardly.

The cylinder block 13 is formed with a chamber 31 accommodating an ultrasonic wave sensor 20 therein. Further, the cylinder block 13 is formed with a port 32 through which hydraulic oil to the lift cylinder 10 is supplied/discharged. The port 32 is connected through a conduit 26 to a control valve 33, and the control valve 33 is connected through a conduit and an oil pump 34 to an oil tank 35. The hydraulic oil is filled in the oil tank 35 and the cylinder tube 12 to serve as power medium of the piston rod 11.

A pressure sensor 25 is installed in the conduit 26 close to the port 32 so as to detect the pressure of the hydraulic oil supplied to/discharged from the cylinder tube 12. The pressure sensor 25 is electrically connected by a wiring 25*a* to a control device 38 described later, so that data on pressure detected by the pressure sensor 25 are sent through the wiring 25*a* to the control device 38.

A temperature sensor 36 is disposed within the chamber 31 to detect the temperature of the hydraulic oil. That is, the temperature sensor 36 detects the temperature of the hydraulic oil within the cylinder tube 12. The temperature sensor 36 is electrically connected by a wiring 36*a* to the control device 38 described later, so that data on temperature detected by the temperature sensor 36 is sent through the wiring 36*a* to the control device 38.

The ultrasonic wave sensor 20 is fixed to the cylinder block 13 so that a transmitter side thereof is confronted with the bottom surface 15*a* of the piston 15. The ultrasonic wave sensor 20 includes a vibration element 21, a case member 22 supporting the vibration element 21, and a cap member 23 covering the vibration element 21. The vibration element 21 is provided with a backing member 24 for absorbing a vibration generated at the rear side. The ultrasonic wave sensor 20 is designed to conduct both of transmission and reception of the ultrasonic wave with one vibration element 21.

The ultrasonic wave generated from the vibration element 21 of the ultrasonic wave sensor 20 (hereafter referred to as "a transmitted wave") is transmitted from the surface of the cap member 23, for example, along a passage indicated by a two-dotted chain line 70 in FIG. 2, and reflected by the bottom surface 15*a* of the piston 15, so that the reflected wave is transmitted along a passage indicated by a two-dotted chain line 71 to be received by the vibration element 21 (hereafter referred to as "a received wave").

The ultrasonic wave sensor 20 is electrically connected through a wiring 39*a* to a transmitter/receptor circuit 37. The transmitter/receptor circuit 37, is electrically connected through a wiring 39*b* to the control device 38.

The control device 38 is provided with a CPU (central processing unit) 38*a*, a counter 38*b* counting a time period from the output of the ultrasonic wave transmitting signal to the reception of such reflected wave, and a storage device 38*c* storing therein a control program, etc.

The transmitter/receptor circuit 37 is provided with an ultrasonic wave transmitter (not shown), and designed to send (output) an ultrasonic wave signal of a predetermined frequency (for example, 0.1 to 5 MHz) to the ultrasonic wave sensor 20 in response to the control signal from the control device 38. The transmitter/receptor circuit 37 has an amplifier and a detector (both not shown in the drawings), so that an analog signal outputted from the ultrasonic sensor 20 is amplified and converted into a pulse signal to be outputted to the control device 38.

The storage device 38*c* stores not only the control program but also data necessary for arithmetic calculation, such as a relational formula or a map indicative of a relationship of the sonic speed to the temperature and the pressure of the hydraulic oil, data necessary for arithmetic calculation of the position of the fork 4*a*, etc.

The CPU 38*a* calculates the pressure and the temperature of the hydraulic oil within the cylinder tube 12 based on the detection signals of the pressure sensor 25 and the temperature sensor 36. The CPU 38*a* calculates the distance L from the ultrasonic wave sensor 20 to the bottom surface 15*a* of the piston 15 based on the measurement time length t from the emission of the transmitted wave to the reception of its reflected wave and the sonic speed c of the ultrasonic wave in the hydraulic oil. The position of the fork 4*a* is calculated from the value thus calculated.

In the present embodiment, the ultrasonic wave sensor 20, the pressure sensor 25, the temperature sensor 36, the transmitter/receptor circuit 37, the control device 38, etc. constitute the position detecting device of the present invention.

Next, a position detecting method using the position detecting device of the embodiment of the present invention will be described.

First of all, to detect the position of the piston 15 within the lift cylinder 10, a measurement request signal is outputted from the CPU 38*a* to the transmitter/receptor circuit 37. The transmitter/receptor circuit 37 then outputs an electric signal of a predetermined frequency to the ultrasonic sensor 20 based on the measurement request signal, and in response thereto an ultrasonic wave of a predetermined frequency is outputted from the ultrasonic wave sensor 20.

The transmitted wave outputted from the ultrasonic wave sensor 20 is transmitted through the hydraulic oil within the cylinder tube 12. When the reflected wave reflected from the bottom surface 15*a* of the piston 15 reaches the ultrasonic wave sensor 20, the ultrasonic wave sensor 20 receives such reflected wave as the received wave, and outputs an electric signal corresponding to the received wave which was received to the transmitter/receptor circuit 37. The transmitter/receptor circuit 37 amplifies an analog signal that is the electric signal inputted from the ultrasonic wave sensor 20, and converts the analog signal into a pulse signal to be outputted to the control device 38.

The CPU 38*a* counts a lasting time period starting from a time point at which the measurement request signal is outputted therefrom to the transmitter/receptor circuit 37 and ending at a time point at which the pulse signal is inputted from the transmitter/receptor circuit 37 thereto, using a counter 38*b*. The CPU 38*a* then calculates a time t from the transmission of the ultrasonic wave to the reception of the reflected wave based on the counted value of the counter 38*b*. The CPU 38*a* calculates the pressure and temperature of the hydraulic oil based on the detection signals of the pressure sensor 25 and the temperature sensor 36, and calculates the sonic speed C in those temperature and pressure based on data (a relational formula or a map indicative of the relationship of the temperature and pressure of the hydraulic oil to the sonic speed) stored in the storage device 38*c*. The CPU 38 then calculates a distance L from the ultrasonic wave sensor 20 to the bottom surface 15*a* of the piston 15 based on the time t (referred to as "the measurement time length") and the sonic speed c using a formula L=ct/2.

Thereafter, the CPU 38*a* calculates the position H of the fork 4*a* from the distance L based on data stored in the storage device 38*c* for correlating the distance L with the position H of the fork 4*a*. The data on the position H of the fork 4*a* thus obtained through the calculation are used, for instance, for control of elevated height of the fork of the forklift.

With the lift cylinder position detecting device or the position detecting method using the position detecting device as constructed above, the sonic speed of the ultrasonic wave in the hydraulic oil is corrected based on the pressure and the temperature detected by the pressure sensor 25 and the temperature sensor 36, and the measurement length of distance L is calculated based on the corrected sonic speed c and the measurement time length t detected by the ultrasonic sensor 20. Therefore, even if the pressure and the temperature within the cylinder tube 12 are varied, the highly accurate measurement length of distance can be obtained, and the position of the piston 15 within the cylinder tube 12 can be detected with high accuracy.

In the present embodiment, the sonic speed of the ultrasonic wave is corrected by using both the pressure and the temperature. Therefore, it is possible to realize the lift cylinder having higher position detecting accuracy in comparison to the conventional lift cylinder in which the sonic speed of the ultrasonic wave is corrected using only the temperature.

The present invention should not be restricted to the embodiment mentioned above, and various modifications and applications are conceivable.

Although the pressure sensor 25 is set in the conduit 26 connected to the port 32 and the temperature sensor 36 is set within the chamber 31, the set position of each sensor is not limited thereto. For example, the pressure sensor 25 may be embedded in the cylinder tube 12.

Although the sonic speed of the ultrasonic wave is corrected based on the pressure and the temperature detected by the pressure sensor 25 and the temperature sensor 36, only the pressure detected by the pressure sensor 25 may be used for correction of the sonic speed.

The pressure sensor 25 or the temperature sensor 36 may be provided at each of plural locations, and the temperature correction and the pressure correction may be carried out based on the results of the detection conducted at the plural locations. In this case, the correction accuracy can be further enhanced.

Although the description has been made on the case where the lift cylinder 10 using the hydraulic oil is used as the hydraulic cylinder, the present invention may be applied to other hydraulic cylinders using various kinds of power media. For example, the present invention may be applied to an air cylinder using air.

The lift cylinder is constructed as a single action type cylinder, but may be constructed to be a plural action type in place of the single action type. The present invention can be applied to not only the lift cylinder 10 of the fork lift 1 but also to a tilt cylinder, a side shift cylinder, and a cylinder for a power steering.

The present invention can be applied to a ram type cylinder other than a piston type cylinder.

Although the ultrasonic wave sensor 20 is constructed as a single device for transmitting and receiving the ultrasonic wave, the ultrasonic wave sensor may be made up of a transmitter device and a receptor device which are separately formed from each other.

Although the ultrasonic sensor 20, the pressure sensor 25, and the temperature sensor 36 are separately attached to the lift cylinder 10, all of the sensors may be structured to be integrated and attached to the lift cylinder 10 together. The pressure sensor 25, the transmitter/receptor circuit 37, the control device 38, etc. may be built in the lift cylinder 10. In this case, the position detecting device for the lift cylinder can be made compact.

Although the present invention has been described with reference to the lift cylinder 10 of the fork lift 1, the present invention can be applied, other than the fork lift, to a high site working vehicle, a concrete pump vehicle, a backhoe vehicle, a dump car and so on, having a cylinder.

As described above, according to the present invention, the position detecting device and position detecting method for the hydraulic cylinder can be realized, which makes it possible to detect the position of the piston within the cylinder with high accuracy by using the ultrasonic sensor even if the pressure within the hydraulic cylinder is varied.

What is claimed is:

1. A hydraulic cylinder position detecting device for detecting a position of a piston with an ultrasonic wave, the piston being movable within a cylinder, the detecting device comprising:

an ultrasonic wave sensor provided within the cylinder for transmitting the ultrasonic wave toward the piston and receiving the ultrasonic wave reflected by the piston;

a pressure sensor for detecting a pressure of fluid through which the ultrasonic wave is transmitted within the cylinder;

arithmetic calculation means for calculating a sonic speed of the ultrasonic wave based on the pressure of fluid detected by the pressure sensor to calculate the position of the piston based on this sonic speed.

2. The position detecting device for the hydraulic cylinder according to claim 1, wherein said pressure sensor is provided to the cylinder.

3. The position detecting device for the hydraulic cylinder according to claim 1, further comprising:

a temperature sensor that detects a temperature of the fluid, wherein said arithmetic calculation means calculating the sonic speed of the ultrasonic wave based on the pressure detected by said pressure sensor and the temperature detected by said temperature sensor to calculate the position of the piston based on this sonic speed.

4. A hydraulic cylinder position detecting method for detecting a position of a piston with an ultrasonic wave, the piston being movable within a cylinder, the detecting method comprising the steps of:

transmitting the ultrasonic wave toward the piston and receiving the ultrasonic wave reflected by the piston;

detecting a pressure of fluid through which the ultrasonic wave is transmitted within the cylinder;

calculating a sonic speed of the ultrasonic wave based on the detected pressure of fluid to calculate the position of the piston based on this sonic speed.

* * * * *